United States Patent
Sampson

(10) Patent No.: US 11,435,998 B2
(45) Date of Patent: Sep. 6, 2022

(54) MANAGEMENT SYSTEM AND METHODOLOGY FOR DISTURBANCE MONITORING EQUIPMENT KNOWN AS USI M9KADMIN

(71) Applicant: Todd Sampson, Fishers, IN (US)

(72) Inventor: Todd Sampson, Fishers, IN (US)

( * ) Notice: Subject to any disclaimer, the term of this patent is extended or adjusted under 35 U.S.C. 154(b) by 0 days.

(21) Appl. No.: 15/687,526

(22) Filed: Aug. 27, 2017

(65) Prior Publication Data

US 2018/0060062 A1    Mar. 1, 2018

Related U.S. Application Data

(60) Provisional application No. 62/380,432, filed on Aug. 28, 2016.

(51) Int. Cl.
| | |
|---|---|
| G06F 8/65 | (2018.01) |
| G06F 11/30 | (2006.01) |
| H04L 9/40 | (2022.01) |
| H04L 67/00 | (2022.01) |
| G06F 11/14 | (2006.01) |

(52) U.S. Cl.
CPC ........... *G06F 8/65* (2013.01); *G06F 11/30* (2013.01); *G06F 11/302* (2013.01); *G06F 11/3051* (2013.01); *H04L 63/02* (2013.01); *H04L 67/34* (2013.01); *G06F 11/1433* (2013.01)

(58) Field of Classification Search
CPC ............ H04B 10/0775; H04L 63/1416; H04L 41/082; H04L 43/08; G01D 4/002; G06F 11/3058; G06F 2221/034; G06F 11/0751; G06F 11/079; G06F 11/3051; G06F 11/3055; G06F 2201/84; G06F 8/65
See application file for complete search history.

(56) References Cited

U.S. PATENT DOCUMENTS

| | | | |
|---|---|---|---|
| 6,178,337 B1 | 1/2001 | Spartz et al. | |
| 6,860,288 B2 | 3/2005 | Uhler | |
| 6,961,641 B1 | 11/2005 | Forth et al. | |
| 7,274,305 B1 | 9/2007 | Luttrell | |

(Continued)

*Primary Examiner* — S. Sough
*Assistant Examiner* — Cheneca Smith
(74) *Attorney, Agent, or Firm* — Ritchison Law Offices, OC; John D Ritchison

(57) ABSTRACT

A computer-implemented system and method of providing utility service network information for a utility service disturbance monitoring equipment management network and system. The system includes six components: an operating system with mirrors/feedback point, a local provider/USI DME application repositories, working snapshots, published snapshots, a quality control test system; and a dedicated provider/USI portion of the Cloud. The process using the system has steps of methodology—updating, creating snapshots and publishing snapshots; added software—adding and publishing specific provider/USI software; verify and test software—testing latest software with a quality control test, if issues fixing and repeating former steps, and, if no issues, publishing latest snapshots to specific provider/USI Cloud, and advising customers that updates are available; and permitting customers to synchronize their local repository with the provider/USI Cloud and using the updated management system for disturbance monitoring equipment to update customer DME systems.

3 Claims, 7 Drawing Sheets

(56) References Cited

U.S. PATENT DOCUMENTS

| | | | |
|---|---|---|---|
| 7,276,915 B1 | 10/2007 | Euler et al. | |
| 7,325,252 B2 * | 1/2008 | Bunker, V | H04L 43/00 726/23 |
| 7,454,281 B2 | 11/2008 | Hori | |
| 7,716,012 B2 | 5/2010 | Bickel et al. | |
| 7,769,149 B2 | 8/2010 | Berkman et al. | |
| 8,103,563 B2 | 1/2012 | O'Neil | |
| 8,103,700 B2 | 1/2012 | Yabuki et al. | |
| 8,184,016 B2 | 5/2012 | Gray et al. | |
| 8,364,802 B1 * | 1/2013 | Keagy | G06F 8/63 709/223 |
| 8,494,686 B2 | 7/2013 | Masters et al. | |
| 8,914,783 B2 * | 12/2014 | Van Camp | G06F 8/65 717/168 |
| 2003/0009696 A1 * | 1/2003 | Bunker V. | H04L 43/00 726/26 |
| 2007/0220506 A1 * | 9/2007 | Maruyama | G06F 8/65 717/168 |
| 2009/0260059 A1 * | 10/2009 | West | H04L 63/105 726/3 |
| 2010/0100250 A1 * | 4/2010 | Budhraja | H02J 13/00034 709/224 |
| 2010/0131084 A1 * | 5/2010 | Van Camp | G06F 8/65 700/86 |
| 2011/0254697 A1 | 10/2011 | Casey et al. | |
| 2013/0063278 A1 | 3/2013 | Prosser et al. | |
| 2014/0337429 A1 * | 11/2014 | Asenjo | H04L 65/403 709/204 |

\* cited by examiner

USI m9kadmin Information Management System Methodology

A. Methodology
Linux or Equal OS and Software
1. Update Linux Mirrors
2. Create Snapshots
3. Publish Snapshots locally

B. USI Software
4. Add USI software to m9k repo
5. Publish m9k

C. Verify Software
6. Verify latest software with QC Test System
7. If there are any issues, fix and repeat the above
8. If there are no issues, publish latest Snapshots to the USI Cloud
9. Tell customers that updates are available

D. Customers
1. Use m9kadmin application to sync their local repository to the USI Cloud
2. Use m9kadmin to apply updates

35

Provider/ USI Production Floor DMEs

*Production Systems are loaded with Linux or Equal and USI software from m9kqc-admin.*

*DMEs are tested and shipped to customers.*

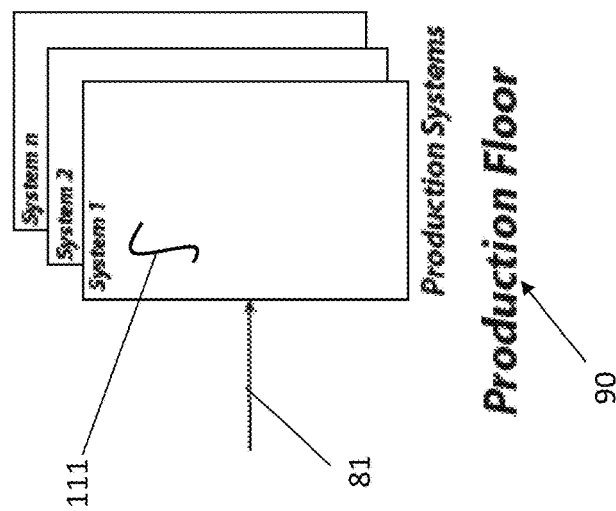

*Production Floor*

**Provider/ USI Management
System Methodology named *m9kadmin***

A. Methodology
Linux or Equal OS and Software
1. Update Linux Mirrors
2. Create Snapshots
3. Publish Snapshots locally

B. Provider/ USI Software
4. Add Provider/ USI software to Provider/ USI repository
5. Publish Provider/ USI Management System update

C. Verify Software
6. Verify latest software with QC Test System
7. If there are any issues, fix and repeat the above
8. If there are no issues, publish latest Snapshots to the Provider/ USI Cloud
9. Tell customers that updates are available

D. Customers
1. Use Provider/ USI management system to sync their local repository to the Provider/ USI Cloud
2. Use Provider/ USI management system updates to apply updates to local repository

MANAGEMENT SYSTEM AND METHODOLOGY FOR DISTURBANCE MONITORING EQUIPMENT KNOWN AS USI M9KADMIN

CROSS-REFERENCE TO RELATED APPLICATIONS

This application claims the benefit of United States Provisional patent application with Ser. No. 62/380,432 filed Aug. 28, 2016 by Todd Sampson and entitled "Management System and Methodology for Disturbance Monitoring Equipment known as USI m9kadmin Information".

FIELD OF INVENTION

The present invention is directed to an apparatus, system and method for electrical utility companies to have efficient and effective real-time electrical disturbance monitoring equipment (DMEs). The present invention relates generally to utility services, and more specifically, to a method and system for providing secure and readily update-able DMEs. Because utility service networks periodically experience equipment failures and system outages. A grid/network is required to monitor and gather information by navigating through several applications to determine the source of the problem. The process of analyzing the system to determine the source of the problem and responding to these occurrences can be very time-consuming. An efficient and effective monitoring system that is secure and easy to update and improve its software is an improvement needed in this field.

FEDERALLY SPONSORED RESEARCH

None.

SEQUENCE LISTING OR PROGRAM

None.

BACKGROUND-FIELD OF INVENTION and PRIOR ART

A novelty search was performed and, as far as known, there are no management systems for disturbance monitoring equipment (DMEs) with the security and improved features shown herein. The system and method named by the provider/USI m9kadmin information is believed to be is unique in its design and technologies.

Prior Art

The novelty search revealed the following: (a) U.S. Pat. No. 8,494,686 entitled Electrical Energy Usage Monitoring System and issued to Masters et al.; (b) Patent Application US2013/0063278 called Utility Network Management System by Prosser et al; (c) U.S. Pat. No. 8,184,016 known as Graphical Representation of Utility Monitoring System Having Multiple Points and issued to Gray et al.; (d) U.S. Pat. No. 8,103,700 entitled Data Management Apparatus and Data Distribution System and issued to Yabuki et al.; (e) U.S. Pat. No. 8,103,563 called System and method For Monitoring, Controlling, and Displaying Utility Information and issued to O'Neil; (f) Patent Application US2011/0254697 entitled Utility Monitoring by Casey et al.; (g) U.S. Pat. No. 7,769,149 called Automated Utility Data Services System and Method and issued to Berkman et al.; (h) U.S. Pat. No. 7,716,012 known as Method for Process Monitoring in a Utility System and issued to Bickel; (i) U.S. Pat. No. 7,454,281 entitled Fault Diagnosis Apparatus or Sensors Used in a System and issued to Hori; (j) U.S. Pat. No. 7,276,915 called Electrical Service Monitoring System and issued to Euler et al.; (k) U.S. Pat. No. 7,274,305 known as Electrical Utility Communications and Control System and issued to Luttrell; (1) U.S. Pat. No. 6,961,641 entitled Intra-Device Communications Architecture for Managing Power Distribution and Consumption and issued to Forth et al.; (m) U.S. Pat. No. 6,860,288 called System and method For Monitoring, Controlling Utility Systems entitled Uhler; and (n) U.S. Pat. No. 6,178,337 known as Wireless Telecommunications Systems Utilizing CDMA Radio Frequency Signal Modulation in Conjunction with the GSM A-Interface Telecommunications Network Protocol and issued to Spartz et al. A careful analysis reveals none of these anticipate a comprehensive computerized a process and system that monitors disturbance of electrical signals and abnormalities like the present Sampson invention.

Problem Solved

The improvement and problems solved as disturbance monitoring systems and equipment are for the utility companies themselves. Utility companies encounter two main challenges when trying to manage ongoing updates to hundreds of computers in remote locations:
1. Security issues arise when software updates are downloaded from the internet, and
2. Manual updates require too many resources and are error prone.

SUMMARY OF THE INVENTION

This invention is a management system for disturbance monitoring equipment (DMEs). Taught here are the ways the system can be improved to be more secure from data hacks on the internet as well as to be more robust, simple to keep software updated, and to use the most modern and reliable software available.

Each provider/USI management system for DMEs utilizes multiple computers that run the Linux operating system (OS) or equal. The computers require software updates on an ongoing basis. The updates—from the utility systems view—can be divided into the following categories: (1) operating system security; (2) operating system functional; and (3) DME application.

The summary above is written from the perspective of the utility company and shows how provider/USI management system for DMEs solves their problem. Other components of the provider/USI management system for DMEs system are required to support the update process. These include:
1. Local—Linux operating system (OS) or equal mirrors;
2. Local provider (USI) DME application repositories;
3. Snapshots;
4. Published snapshots;
5. Quality control test system; and
6. Segregated portion of provider USI on the Cloud.

The preferred embodiment of a management system 30 for disturbance monitoring Equipment (DMEs) is comprised of the above six elements/components: (a) Local Linux operating system (OS) or equal mirrors; (b) Local provider/USI DME application repositories; (c) snapshots; (d) published snapshots; (e) quality control test system; and (f) provider/USI specific portion on the Cloud.

Objects and Advantages

There are several objects and advantages of the management system for disturbance monitoring equipment (DMEs). The main advantages are that the provider/USI management system for DMEs—solves both challenges:
1. Security—One provider/USI host with an internet connection downloads the software repositories from the provider/USI Cloud. The provider/USI host shares its drive with a second provider/USI host that manages the updates. This architecture allows provider/USI management system for DMEs to have full access to the software repositories on provider/USI repository while providing a secure firewall between provider/USI management system for DMEs and the internet. Thus, the network of the utility company is insulated from the internet.
2. Update Management—The provider/USI management system for DMEs user interface allows the user to select updates provided by provider/USI and target individual hosts, named groups of hosts, or all hosts to receive the update. Status for each targeted host is returned for troubleshooting and documentation purposes. A profiling task can be run on any or all targets to return all installed version numbers as well as any desired system parameter, such as hard drive fullness, CPU usage, DME health, etc.

Finally, other advantages and additional features of the present management system for disturbance monitoring equipment (DMEs) will be more apparent from the accompanying drawings and from the full description of the device. For one skilled in the art of disturbance monitoring equipment and systems, it is readily understood that the unique improvements and features shown in the examples with this system are readily adapted to other types of DME systems and processes.

DESCRIPTION OF THE DRAWINGS—FIGURES

The accompanying drawings, which are incorporated in and constitute a part of this specification, illustrate an embodiment of the management system for disturbance monitoring equipment (DMEs)(management systems for DMEs) that is preferred. The drawings together with the summary description given above and a detailed description given below serve to explain the principles of the management system for. It is understood, however, that the unique features and improvements to the DME management and systems are not limited to only the precise arrangements and instrumentalities shown.

FIG. 5 shows the features of the provider/USI production floor DMEs receiving software and data from the provider/USI repository and ready to perform tests prior to shipment to customers.

FIG. 7 shows the steps of the methodology for the Management System and Methodology for disturbance monitoring equipment named USI m9kadmin.

DESCRIPTION OF THE DRAWINGS—REFERENCE NUMERALS

Figure 1:
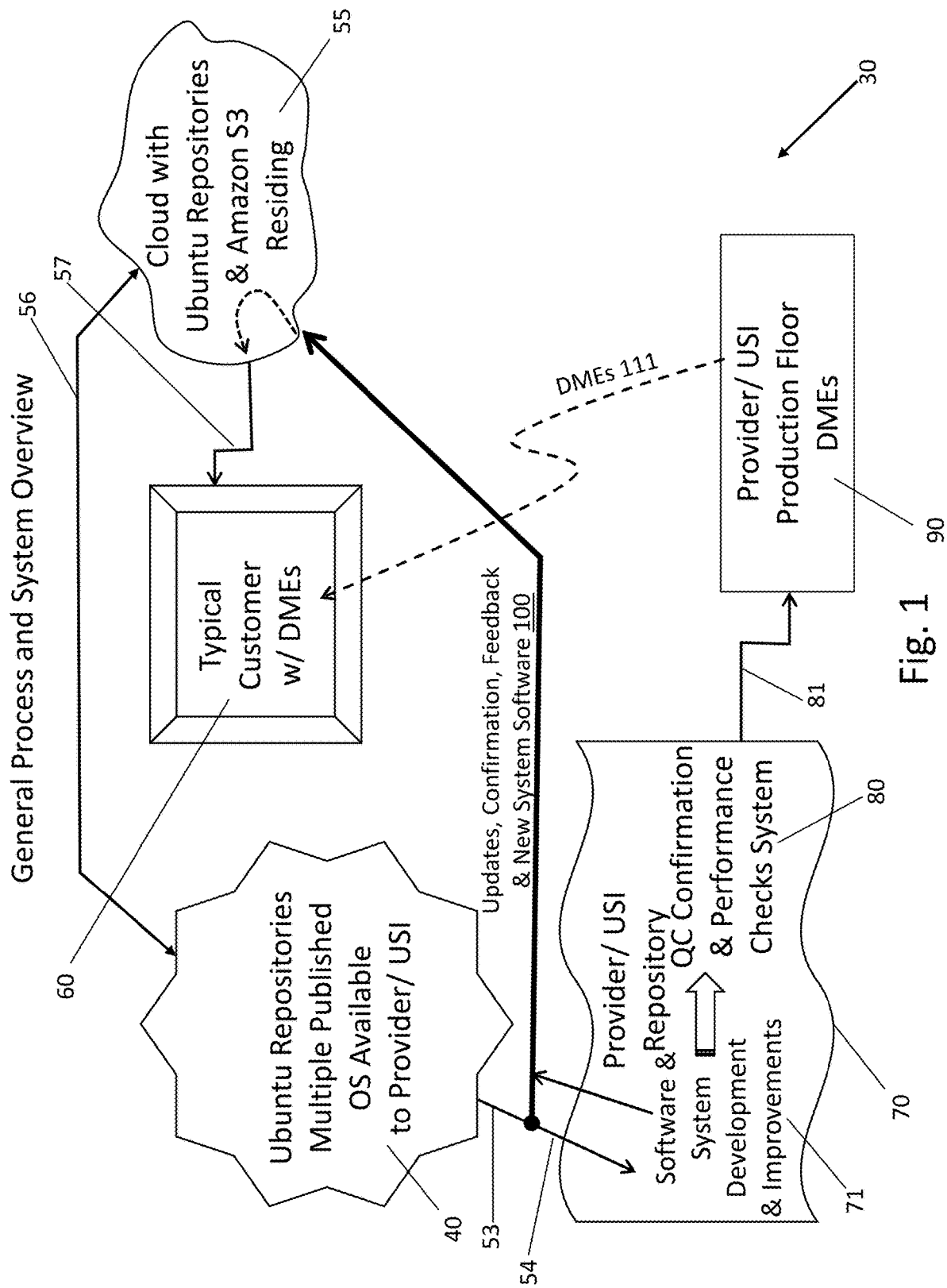
FIG. 1 is the general process and systems overview for the management system and methodology for disturbance monitoring equipment named m9kadmin.

The following list refers to the drawing reference numbers:

| Ref # | Description |
|---|---|
| 30 | management system 30 for Disturbance Monitoring Equipment (DMEs) known as USI m9kadmin (management systems for DMEs). |
| 35 | methodology 35 for Disturbance Monitoring Equipment known as USI m9kadmin. |
| 38 | individual customer management system 38 directly tied with their DMEs 111 |
| 40 | Linux operating system (OS) or equal 40 of multiple published Operating system (OS) available to USI |
| 41 | main mirror 41 with selected Linux operating system (OS) or equal update level for example and not as a limitation) updates to incorporate with the USI software |
| 42 | security mirror 42 with selected Linux operating system (OS) or equal - update level for example and not as a limitation) with security updates to incorporate with the USI software |
| 43 | potential mirrors 43 selected Linux or equal to incorporate with the USI software |
| 44 | full domain 44 of Linux or equal mirrors considered for USI improvements |
| 45 | example of dates 45 when mirrors are snapped - i.e. date of snapshots |
| 46 | selected mirrors 46 deemed appropriate to publish and use with the USI software 70 |
| 53 | data feed 53 from Linux operating system (OS) or equal 40 to Cloud 55 |
| 54 | data feed 54 from Linux operating system (OS) or equal 40 to USI Repository 70 |
| 55 | Cloud 55 with Linux operating system (OS) or equal & Amazon RTM systems or equal Residing |
| 56 | data feed 56 to and from Cloud 55 to Linux operating system (OS) or equal 40 |
| 57 | data feed 57 from Cloud 55 to Typical Customer 60 |
| 58 | full gamut 58 of Linux operating system (OS) or equal 40 available on Cloud 55 |
| 59 | Amazon RTM system or equal 59 example of specific downloadable initial and updates for customer DMEs 111 |
| 60 | typical customer installation 60 w/ DMEs 111 |
| 61 | customer firewall 61 connected into Cloud 55 and protecting/buffeting customer 60 |
| 62 | local area network (LAN) 62 - intranet not web based |
| 63 | customer webmaster 63 over their LAN 62 and systems |
| 64 | security share shell 64 isolated from internet |
| 70 | USI repository 70 |
| 71 | software and system development 71 |
| 72 | dated snapshots 72 for each system update |
| 73 | main repository 73 for USI m9kadmin 30 |
| 74 | publishing step 74 to provide new system and updated system QC testing 80 |
| 75 | network-attached storage (NAS) 75 is a file - level computer data storage server connected to a computer network providing data access to a heterogeneous group of clients |

-continued

| Ref # | Description |
|---|---|
| 76 | network file system (NFS) 76 |
| 80 | Quality Control (QC) confirmation and performance checks 80 |
| 81 | data feed 81 from Quality Control (QC) confirmation and performance checks 80 to USI production floor 90 |
| 82 | m9kQC master 82 Linux operating system (OS) or equal (for example and not limitation) comprised of, a typical web server software, a database software and open-source relational database management system (RDBMS), and specially developed m9kstation (these software and database systems named are for example and not limitation) |
| 83 | repository 83 for the m9kQC master 82 |
| 84 | administrative section 84 for the m9kQC master 82 |
| 90 | USI production floor 90 with DMEs 111 |
| 100 | data feed updates, confirmation, feedback, and new/tested system software 100 |
| 110 | typical customer system and the inter connection 110 with the Disturbance Monitoring Equipment 111 and the electrical power substations and electrical distribution |
| 111 | Disturbance Monitoring Equipment (DMEs) 111 |
| 112 | electrical power substations 112 |
| 113 | electrical distribution system 113 |
| 115 | data acquisition unit 115 |
| 116 | digital fault recorder (DFR) 116 |
| 117 | sequence of events recorder (SER) 117 |
| 118 | Dynamic Disturbance recorder (DDR) 118 |
| 119 | continuous oscillography 119 |
| 120 | phasor measurement unit (PMU) 120 |

DETAILED DESCRIPTION OF PREFERRED EMBODIMENT

The present invention is directed to an apparatus, system and method for electrical utility companies to have efficient and effective real-time electrical disturbance monitoring equipment (DMEs). The present invention relates generally to utility services, and more specifically, to a method and system for providing secure and readily update-able DMEs.

The advantages for the management system 30 for disturbance monitoring equipment (DMEs) are listed above in the introduction. Succinctly the benefits are that the device:
1. Security—One host provider/USI repository with an internet connection downloads the software repositories from the provider/USI Cloud. The provider/USI host shares its drive with a second host (provider/USI) that manages the updates. The network of the utility company is insulated from the internet.
2. Update Management—The provider/USI user interface allows the user to select updates provided by provider/Non-Provisional USI and target individual hosts, named groups of hosts, or all hosts to receive the update. Status for each targeted host is returned for troubleshooting and documentation purposes.

The preferred embodiment of a management system 30 for disturbance monitoring equipment (DMEs) named m9kadmin is comprised of the above six elements/components: (a) local Linux operating system (OS) or equal with mirrors; (b) local provider/USI DME application repositories; (c) snapshots; (d) published snapshots; (e) quality control test system; and (f) provider/USI specific portion of the Cloud.

There is shown in FIGS. 1-7 a complete description and operative embodiment of the management system 30 for disturbance monitoring equipment (DMEs). In the drawings and illustrations, one notes well that the FIGS. 1-7 demonstrate the general configuration and use of this product.

The accompanying drawings, which are incorporated in and constitute a part of this specification, illustrate an embodiment of the management system 30 for disturbance monitoring equipment (DMEs) that is preferred. The drawings together with the summary description given above and a detailed description given below serve to explain the principles of the system and methods 30, 35. It is understood, however, that the management systems for DMEs 30 named USI m9kadmin is not limited to only the precise arrangements and instrumentalities shown. Other examples of DME system and process methods and uses are still understood by one skilled in the art of DME administrative and control system and devices to be within the scope and spirit shown here.

Each management system 30 for disturbance monitoring equipment (DMEs) utilizes multiple computers that run the Linux operating system. The computers require software updates on an ongoing basis. The updates can be divided into the following categories: (1) operating system security; (2) operating system functional; and (3) disturbance monitoring equipment application. The summary is written from the perspective of the utility company and shows how provider/USI management system for DMEs 30 solves their problem. Other components of the provider/USI management system for DMEs 30 are required to support the update process comprise the local Linux or equal mirrors; local provider/USI DME application repositories; snapshots (on a periodical timing); published snapshots (for later use a place markers or recovery points); quality control test system; and the provider/USI Cloud. How these are generally operated is described below in the operation section.

FIG. 1 is the general process and systems overview for the management system and methodology for disturbance monitoring equipment named USI m9kadmin. In this sketch are shown: a management system 30 for disturbance monitoring equipment (DMEs); the Linux OS 40 of multiple published operating system (OS) available to provider/USI; a data feed 53 from Linux repository 40 to Cloud 55; a data feed 54 from Linux OS 40 to provider/USI Repository 70; a Cloud 55 with Linux operating system (OS) or equal and Amazon® system or equal Residing; a data feed 56 to and from Cloud 55 to Linux OS 40; a data feed 57 from Cloud 55 to typical customer 60; a typical customer installation 60 with DMEs 111; a provider/USI repository 70; a software and system development 71; a quality control (QC) confirmation and performance checks 80; a data feed 81 from quality control (QC) confirmation and performance checks 80 to provider/USI production floor 90; a provider/USI production floor 90 with DMEs 111; a data feed updates, confirmation, feedback, and new/tested system software 100; and a set of disturbance monitoring equipment (DMEs) 111.

An operating system (OS) is system software that manages computer hardware and software resources and provides common services for computer programs. All computer programs, excluding firmware, require an operating system to function. Dominant desktop operating system are Microsoft Windows, macOS by Apple Inc., and the varieties of Linux. Apache Software Foundation most commonly used on a Unix-like system (usually Linux), the software is available for a wide variety of operating systems besides Unix, including eComStation, Microsoft Windows, NetWare, OpenVMS—virtual memory system. (that is the successor to the VMS operating system produced by Digital Equipment Corporation), OS/2—a series of computer operating systems, initially created by Microsoft. and IBM, and TPF—Transaction Processing Facility, an operating system by IBM.

Figure 2:
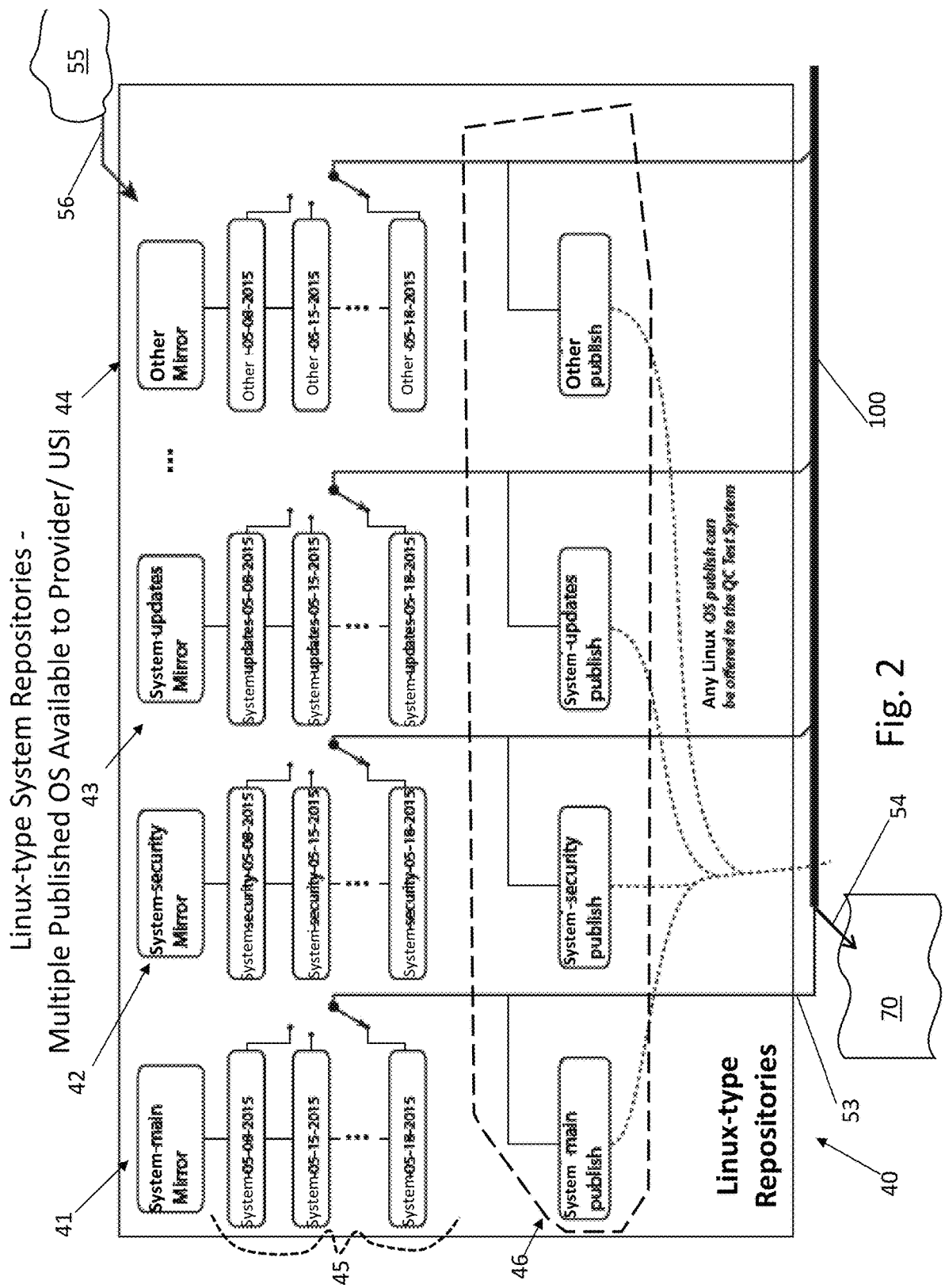
FIG. 2 shows the features of the Linux operating system (OS) or equal-multiple published OS available to provider/USI for it use with software and system completion.

FIG. 2 shows the features of the Linux operating system (OS) or equal 40—multiple published OS available to provider/USI for it use with software and system completion. This view shows features and improvements such as the Linux OS 40 of multiple published operating system (OS) available to provider/USI; the main mirror 41 with selected Linux OS for example and not as a limitation) updates to incorporate with the provider/USI software; the security mirror 42 with selected Linux OS with security updates to incorporate with the provider/USI software; the potential mirrors 43 selected Linux or equal to incorporate with the provider/USI software; the full domain 44 of Linux mirrors considered for USI improvements; the example of dates 45 when mirrors are snapped—i.e. date of snapshots; the selected mirrors 46 deemed appropriate to publish and use with the provider/USI software 70; the data feed 53 from Linux OS 40 to Cloud 55; the data feed 54 from Linux OS 40 to provider/USI repository 70; the Cloud 55 with Linux OS and Amazon® system or equal residing; the data feed 56 to and from Cloud 55 to Linux OS 40; the provider/USI repository 70; and the data feed updates, confirmation, feedback, and new/tested system software 100.

A computer information file repository (repository) is an easy way to deploy a secondary tier of data storage that can comprise multiple, networked data storage technologies running on diverse operating systems, where data that no longer needs to be in primary storage is protected, classified according to captured metadata, processed, de-duplicated, and then purged, automatically, based on data service level objectives and requirements. In information repositories, data storage resources are virtualized as composite storage sets and operate as a federated environment. The repository is a technology used to store complex structured and unstructured information used by a computer system. The initial use of the term was in connection with expert systems which were the first knowledge-based systems. Information repositories feature robust, client based data search and recovery capabilities that, based on permissions, enable end users to search the information repository, view information repository contents, including data on off-line media, and recover individual files or multiple files to either their original network computer or another network computer. Information repositories were developed to mitigate problems arising from data proliferation and eliminate the need for separately deployed data storage solutions because of the concurrent deployment of diverse storage technologies running diverse operating systems. They feature centralized management for all deployed data storage resources. They are self-contained, support heterogeneous storage resources, support resource management to add, maintain, recycle, and terminate media, track of off-line media, and operate autonomously.

Figure 3:
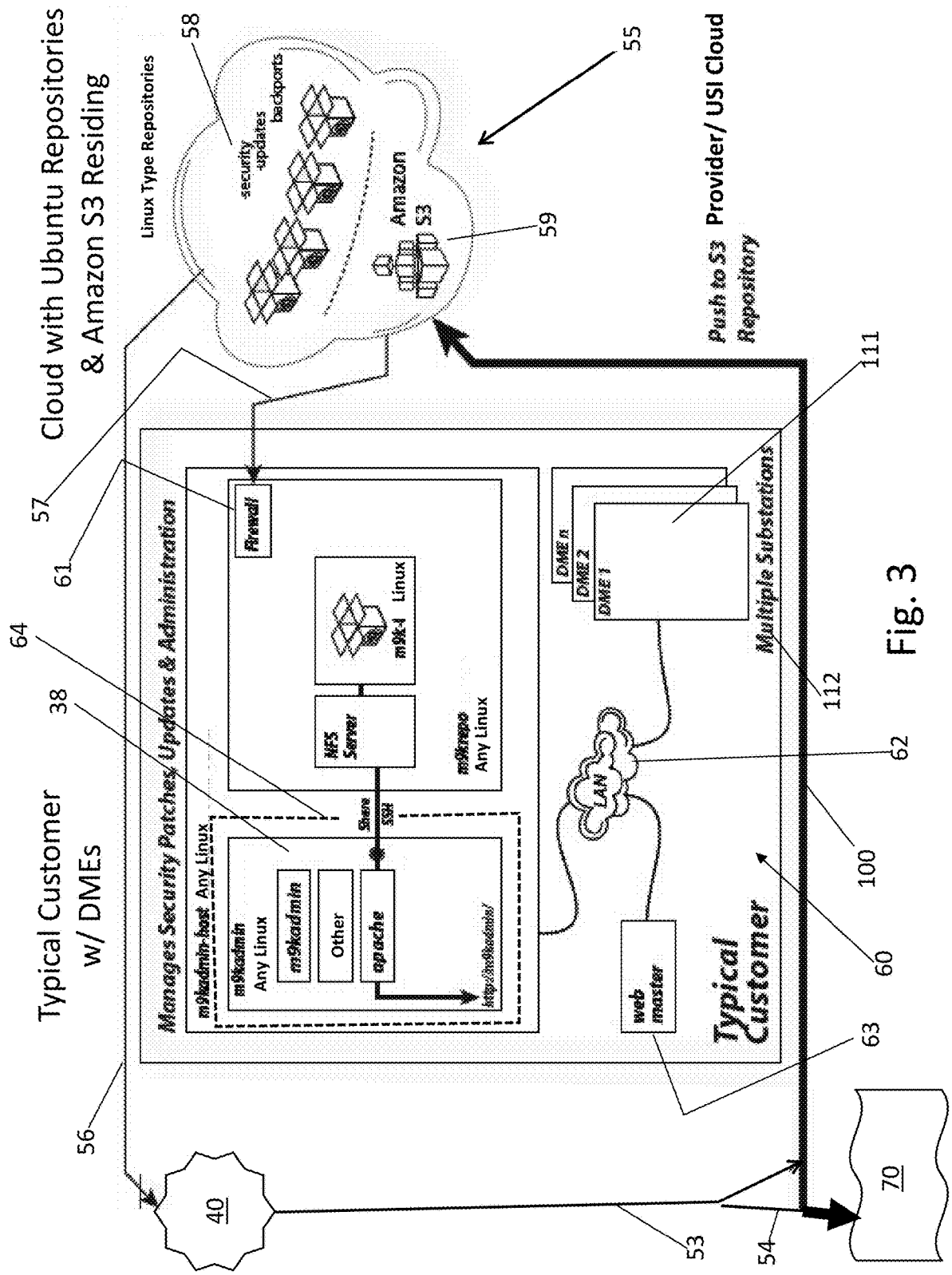
FIG. 3 shows the features of the typical customer with disturbance monitoring equipment (DMEs) and also shows the Cloud with the Linux operating system (OS) or equal and Amazon® system for examples.

FIG. 3 shows the features of the typical customer with disturbance monitoring equipment (DMEs) 60 and also shows the Cloud 55 with the Linux OS and Amazon® or equal system for examples. In this sketch are demonstrated and shown: the individual customer management system 38 directly tied with their DMEs 111; the Linux OS 40 of multiple published operating system (OS) available to USI; the data feed 53 from Linux OS 40 to Cloud 55; the data feed 54 from Linux OS 40 to provider/USI repository 70; the Cloud 55 with Linux OS and Amazon® system or equal residing; the data feed 56 to and from Cloud 55 to Linux OS 40; the data feed 57 from Cloud 55 to typical customer 60; the full gamut 58 of Linux OS available on Cloud 55; the Amazon® system or equal 59 example of specific downloadable initial and updates for customer DMEs 111; the typical customer installation 60 with DMEs 111; a customer firewall 61 connected into Cloud 55 and protecting/buffeting customer 60; a local area network (LAN) 62—intranet not web based; customer webmaster 63 over their LAN 62 and systems; a security share shell 64 isolated from internet; the provider/USI repository 70; the data feed updates, confirmation, feedback, and new/tested system software 100; the disturbance monitoring equipment (DMEs) 111; and the electrical power substations 112.

In the simplest terms, cloud computing means storing and accessing data and programs over the Internet instead of a hard drive of the computer. The cloud is therefore in most ways a metaphor for the Internet. Cloud computing is a computing-infrastructure and software model for enabling universal access to shared pools of configurable resources (such as computer networks, servers, storage, applications and services), which can be rapidly provisioned (provide new services) with minimal management effort, often over the Internet. Cloud computing allows users and enterprises with various computing capabilities to store and process data either in a privately-owned cloud, or on a third-party server located in a data center—thus making data-accessing mechanisms more efficient and reliable. Cloud computing relies on sharing of resources to achieve coherence and economy of scale, similar to a utility. Cloud computing allows companies to avoid or minimize up-front infrastructure costs. As well, third-party clouds enable organizations to focus on their core businesses instead of expending resources on computer infrastructure and maintenance. The main enabling technology for cloud computing is virtualization. Virtualization software separates a physical computing device into one or more "virtual" devices, each of which can be easily used and managed to perform computing tasks. With operating system-level virtualization essentially creating a scalable system of multiple independent computing devices, idle computing resources can be allocated and used more efficiently. Virtualization provides the agility required to speed up IT operations, and reduces cost by increasing infrastructure utilization. Finally, the Cloud provides improved agility for organizations, as cloud computing may increase the flexibility of the user with re-provisioning, adding, or expanding technological infrastructure resources.

Figure 4:
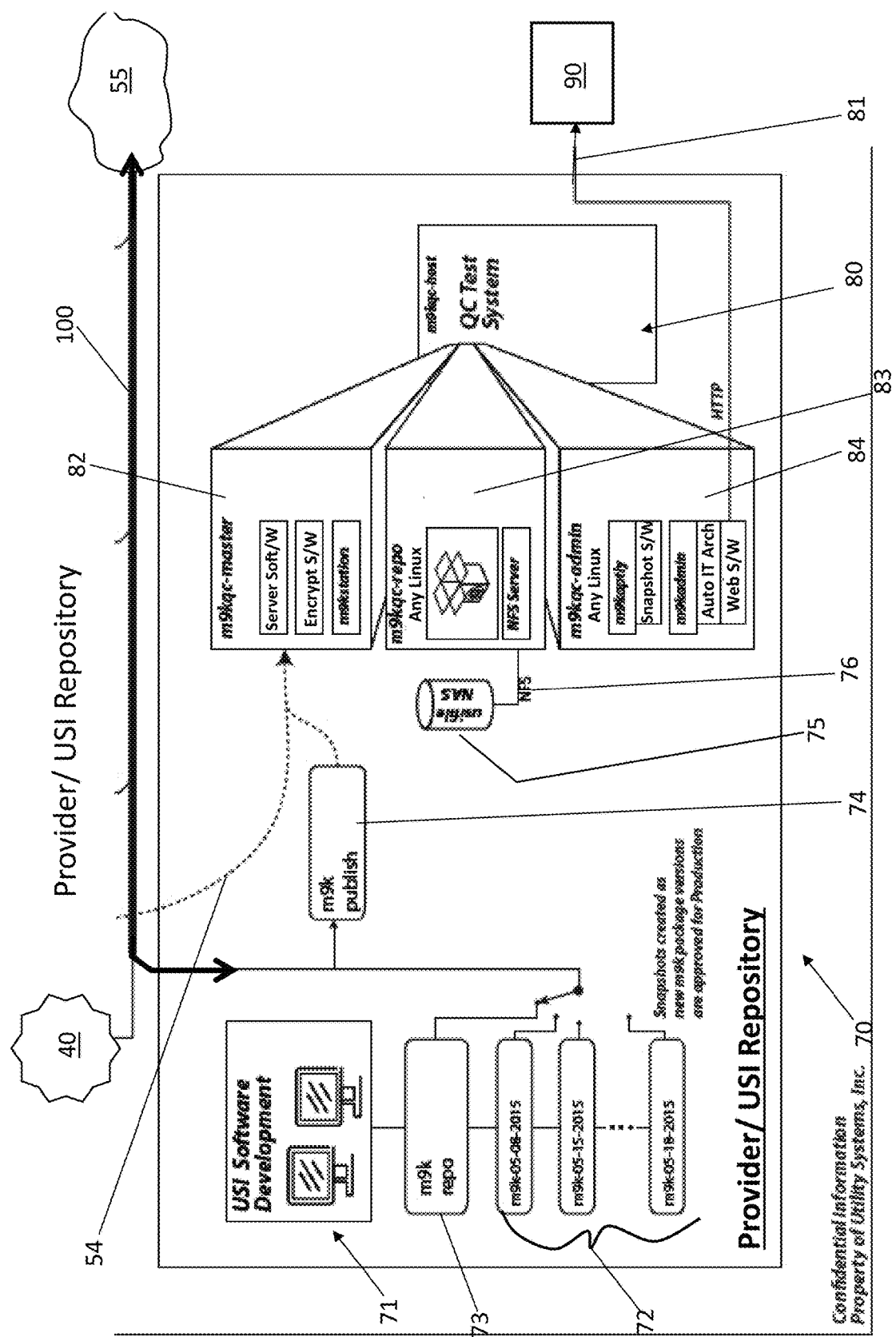
FIG. 4 shows the features of the provider/USI repository including its software and system development and improvements plus its QC Confirmation and Performance Checks System.

FIG. 4 shows the features of the provider/USI repository 70 including its software and system development and improvements 71 plus its quality control (QC) confirmation and performance checks System 80. Provided in this sketch are: the provider/USI repository 70; the software and system development 71; the dated snapshots 72 for each system update; the main repository 73 for provider/USI management system for DMEs 30; the publishing step 74 to provide new system and updated system QC testing 80; the network-attached storage (NAS) 75 as a file-level computer data storage server connected to a computer network providing data access to a heterogeneous group of clients; a network file system (NFS) 76; the quality control (QC) confirmation and performance checks 80; the data feed 81 from quality control (QC) confirmation and performance checks 80 to provider/USI production floor 90; the provider/USI master 82 Linux operating system (OS) or equal (for example and not limitation) comprised of a typical web server software, a database software and open-source relational database management system (RDBMS), and specially developed provider/USI software (these software and database systems named are for example and not limitation); the repository 83 for the provider/USI master 82; the administrative section 84 for the provider/USI master 82; the provider/USI production floor 90 with DMEs 111; and the data feed updates, confirmation, feedback, and new/tested system software 100.

In data storage, disk mirroring (or mirror) is the replication of logical disk volumes onto separate physical hard disks in real time to ensure continuous availability. A mirrored volume is a complete logical representation of separate volume copies. In a disaster recovery context, mirroring data over long distance is referred to as storage replication. Depending on the technologies used, replication can be performed synchronously, asynchronously, semi-synchronously, or point-in-time. Replication is enabled via microcode on the disk array controller or via server software. It is typically a proprietary solution, not compatible between various data storage device vendors. Mirroring is typically only synchronous. Synchronous writing typically achieves a recovery point objective (RPO) of zero lost data. Asynchronous replication can achieve an RPO of just a few seconds while the remaining methodologies provide an RPO of a few minutes to perhaps several hours. Disk mirroring differs from disk snapshots where data images are never re-synced with their origins.

In computer systems, a snapshot is the state of a system at a particular point in time. The term was coined as an analogy to that in photography. It can refer to an actual copy of the state of a system or to a capability provided by certain systems. A full backup of a large data set may take a long time to complete. On multi-tasking or multi-user systems, there may be writes to that data while it is being backed up. One approach to safely backing up live data is to temporarily disable write access to data during the backup, either by stopping the accessing applications or by using the locking Application programming interface (API) provided by the operating system to enforce exclusive read access. This is tolerable for low-availability systems (on desktop computers and small workgroup servers, on which regular downtime is acceptable). High-availability 24/7 systems, however, cannot bear service stoppages. To avoid downtime, high-availability systems may instead perform the backup on a snapshot—a read-only copy of the data set frozen at a point in time—and allow applications to continue writing to their data. Read-write snapshots are sometimes called branching snapshots, because they implicitly create diverging versions of their data.

FIG. 5 shows the features of the provider/USI production floor DMEs 90 receiving software and data from the provider/USI Repository 70 and ready to perform tests prior to shipment to customers. Shown in this view are: the methodology 35 for disturbance monitoring equipment; the data feed 81 from quality control (QC) confirmation and performance checks 80 to provider/USI production floor 90; the provider/USI production floor 90 with DMEs 111 disturbance; and the disturbance monitoring equipment (DMEs) 111.

Figure 6:
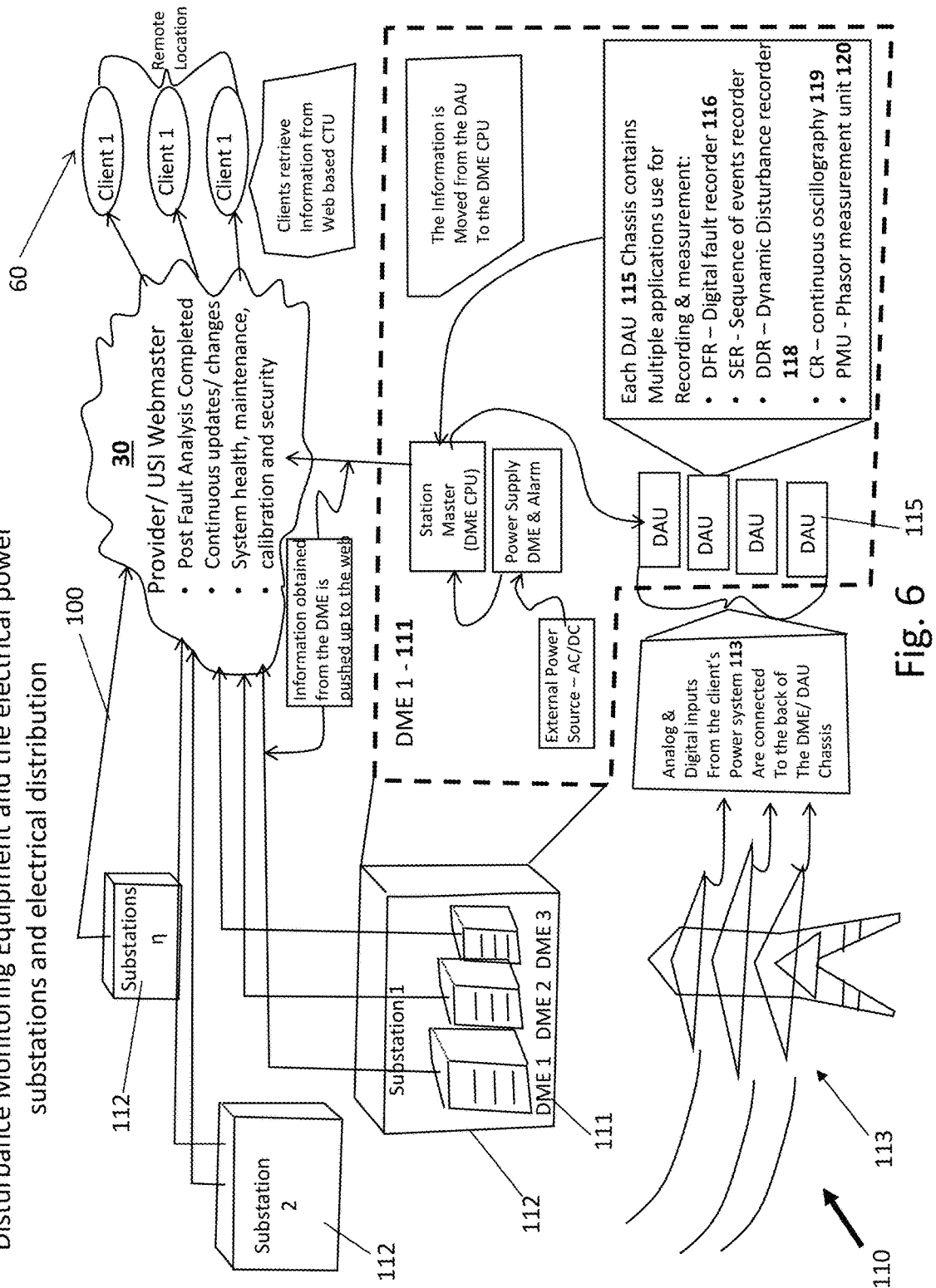
FIG. 6 shows the features of the typical customer system and the inter connection with the disturbance monitoring equipment and the electrical power substations and electrical distribution.

FIG. 6 shows the features of the typical customer system 110 and the inter connection with the disturbance monitoring equipment and the electrical power substations and electrical distribution. This graphical depiction includes: a management system 30 for disturbance monitoring equipment (DMEs); the typical customer installation 60 with DMEs 111; the data feed updates, confirmation, feedback, and new/tested system software 100; a typical customer system and the inter connection 110 with the disturbance monitoring equipment 111 and the electrical power substations 112 and electrical distribution 113; the disturbance monitoring equipment (DMEs) 111; the electrical power substations 112; the electrical distribution system 113; a data acquisition unit 115; a digital fault recorder (DFR) 116; a sequence of events recorder (SER) 117; a dynamic disturbance recorder (DDR) 118; a continuous oscillography 119; and a phasor measurement unit (PMU) 120.

FIG. 7 shows the steps of the methodology 35 for the management system and methodology for disturbance monitoring equipment. It is discussed below in the operation section that follows.

The details mentioned here are exemplary and not limiting. Other specific components and manners specific to describing a management system 30 for disturbance monitoring equipment (DMEs) may be added as a person having ordinary skill in the field of the art of DME system management and improved processes.

Operation of the Preferred Embodiment

The management system 30 for disturbance monitoring equipment (DMEs) has been described in the above embodiment. The manner of how the device operates is now described. One notes well that the description above and the operation described here must be taken together to fully illustrate the concept of the management system 30 for disturbance monitoring equipment (DMEs). The preferred embodiment of a management system 30 for disturbance monitoring equipment (DMEs) is comprised of the above six elements/components: (a) local Linux OS mirrors; (b) local provider/USI DME application repositories; (c) snapshots; (d) published snapshots; (e) quality control test system; and (f) provider/USI special/portion of the Cloud.

The general operation of the general equipment and features in the system may be described as:
  A. Local Linux OS mirrors allow provider/USI to download and store the latest Linux OS updates. The mirrors contain all of the downloaded software versions and change over time as the mirrors are periodically updated.
  B. The local provider/USI DME application repository captures all of the provider/USI software updates that become available over time.
  C. A snapshot is made of a mirror. The current date is included in the name of a snapshot because the snapshot captures the contents of a mirror at the time the snapshot is made. Snapshots support software revision control. If the software in the latest snapshot causes a problem, the previous snapshot or any other snapshot can be used.
  D. Published snapshots behave like a repository and allow the provider/USI quality control test system to access the software for testing.
  E. The quality control test system is used to run regression tests on the software in the Snapshot that is being tested. If the regression tests pass, the new snapshots are uploaded to the provider/USI Cloud.
  F. The provider/USI Cloud contains the latest software that has been tested and approved by provider/USI. After provider/USI updates the provider/USI Cloud, customers are notified that updates are available. The customers use management system 30 for disturbance monitoring equipment (DMEs) with repository management software to synchronize their local repositories with the provider/USI Cloud and perform the desired updates on their DMEs.

FIG. 7 shows the steps of the methodology 35 for the management system and methodology for disturbance monitoring equipment (DMEs).

Operation Steps

A. Methodology—Linux OS and Software (or Equal)

Step 1. Update Linux mirrors

Step 2. Create snapshots

Step 3. Publish snapshots locally

B. Provider USI Software

Step 4. Add provider/USI software to provider/USI repository

Step 5. Publish provider/USI software

C. Verify Software

Step 6. Verify latest software with QC test system

Step 7. If there are any issues, fix and repeat the above

Step 8. If there are no issues, publish latest snapshots to the provider/USI Cloud Step 9. Tell customers that updates are available D. Customers Step 1. Use management system 30 for disturbance monitoring equipment (DMEs) application to sync their local repository to the provider/USI Cloud Step 2. Use management system 30 for disturbance monitoring equipment (DMEs) to apply updates With this description it is to be understood that the management system 30 for disturbance monitoring equipment (DMEs) is not to be limited to only the disclosed embodiment of product. The features of the management system 30 for disturbance monitoring equipment (DMEs) are intended to cover various modifications and equivalent arrangements included within the spirit and scope of the description.

Unless defined otherwise, all technical and scientific terms used herein have the same meaning as commonly understood by one of ordinary skills in the art to which these inventions belong. Although any methods and materials similar or equivalent to those described herein can also be used in the practice or testing of the present inventions, the preferred methods and materials are now described. All patents and publications mentioned herein, including those cited in the background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements/components of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a tool of a carpenter tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A management system for managing updates and reducing errors to a set of controls and software for disturbance monitoring equipment (DME), the management system comprising:
    (a) the DME being located remotely at an electrical power substation of a utility company and comprising a non-transitory computer-readable medium having instructions stored thereon that, in response to execution by a processor, cause operations of a local operating system and at least one operating system mirror to be performed;
    (b) at least one disturbance monitoring equipment (DME) application software repository of a provider of the electrical power substation that maintains the management system for the disturbance monitoring equipment of a network of a utility company client;
    (c) a local provider portion of a cloud isolated and controlled by the provider; and
    (d) a quality control and performance test system by the provider utilized on a latest update to a DME application software including a security share shell isolated from the internet;
    wherein the repository comprises a group of current snapshots from the management system for the DME of the utility company that represent a state of data of the DME of the utility company at a particular current point of time, and at least one published snapshot of the latest update of DME application software uploaded by the provider to the provider portion of the cloud for availability to the utility company; and
    wherein the provider, in a security share shell isolated from internet:
    either verifies or fixes and verifies the group of current snapshots of the utility company with the latest update of DME application software;
    then completes quality control and performance tests;
    then using a secured internet connection, makes a first download of the latest update of the DME application software for a repository of a client to the local provider portion of the Cloud; and
    next, advises the utility company;
    wherein the utility company makes a second download of the latest update of the DME application software from the provider portion of the cloud, and while insulated from the internet and cloud by a firewall, remotely makes an upload of the latest update of the DME application software to a separate local area network (LAN) for the DME at a substation of the utility company, thereby assuring the separate LAN of the utility company remains fully insulated from the internet during each of the first download, the second download, and the upload of the latest update.

2. The management system for disturbance monitoring equipment of claim 1 wherein the operating system is selected from the group consisting of Linux, eComStation, Microsoft Windows, NetWare, Open virtual memory system (VMS), mac/OS by Apple Inc., OS/2—a series created by Microsoft and IBM, and Transaction Processing Facility (TPF).

3. A management system for managing updates and reducing errors to a set of controls and software for disturbance monitoring equipment (DME), the management system comprising:
    (a) the DME being located remotely at an electrical power substation of a utility company and comprising a non-transitory computer-readable medium having instructions stored thereon that, in response to execution by a processor, cause operations of a local Linux operating system and at least one Linux operating system mirror to be performed;
    (b) at least one disturbance monitoring equipment (DME) application software repository of a provider of the electrical power substation that maintains the management system for the disturbance monitoring equipment of a network of a utility company client;
    (c) a local provider portion of a cloud isolated and controlled by the provider; and
    (d) a quality control and performance test system by the provider utilized on a latest update to a DME application software including a security share shell isolated from the internet;
    wherein the repository comprises a group of current snapshots from the management system for the DME of the utility company that represent a state of data of the DME of the utility company at a particular current point of time, and at least one published snapshot of the latest update of DME application software uploaded by the provider to the provider portion of the cloud for availability to the utility company; and
    wherein the provider, in a security share shell isolated from internet:
    either verifies or fixes and verifies the group of current snapshots of the utility company with the latest update of DME application software offline;
    then completes quality control and performance tests;
    then using a secured internet connection, makes a first download of the latest update of the DME application software for a repository of a client to the local provider portion of the Cloud; and
    next, advises the utility company;
    wherein the utility company makes a second download of the latest update of the DME application software from the provider portion of the cloud, and while insulated from the internet and cloud by a firewall, remotely makes an upload of the latest update of the DME application software to a separate local area network (LAN) for the DME at a substation of the utility company, thereby assuring the separate LAN of the utility company remains fully insulated from the internet during each of the first download, the second download, and the upload of the latest update.

* * * * *